UNITED STATES PATENT OFFICE.

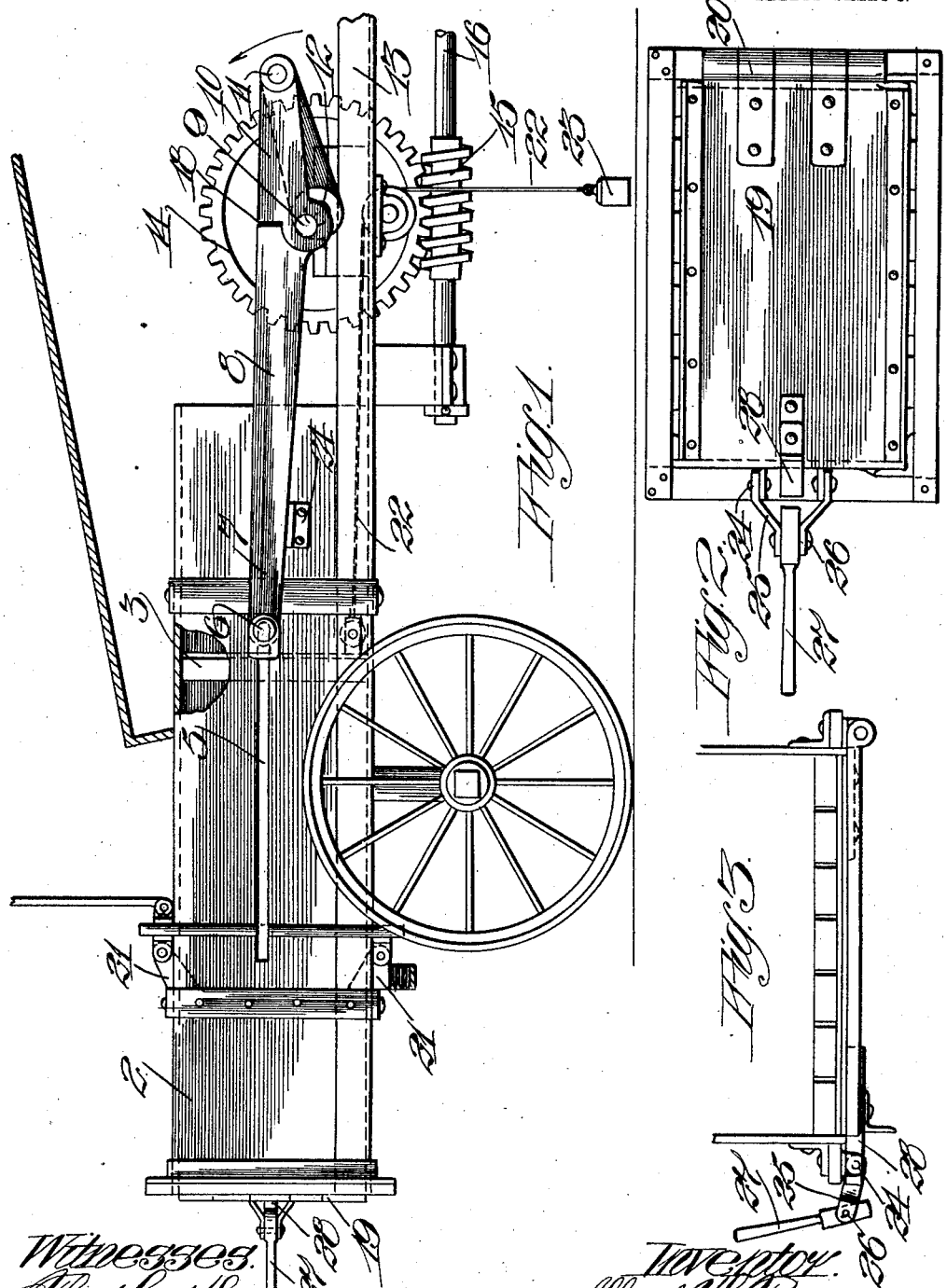

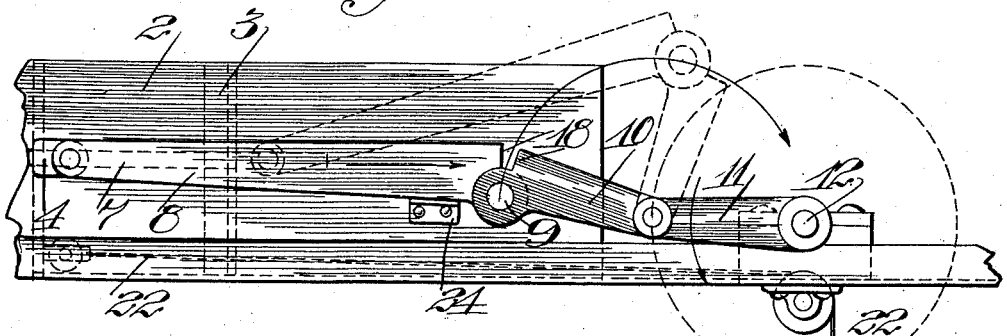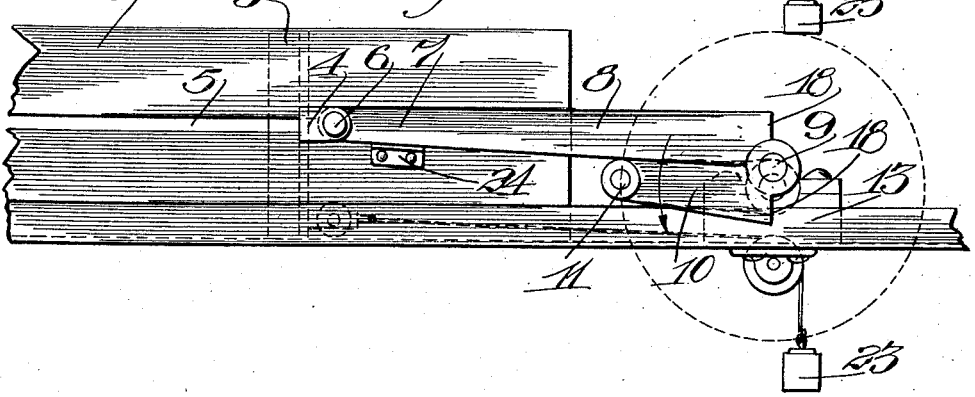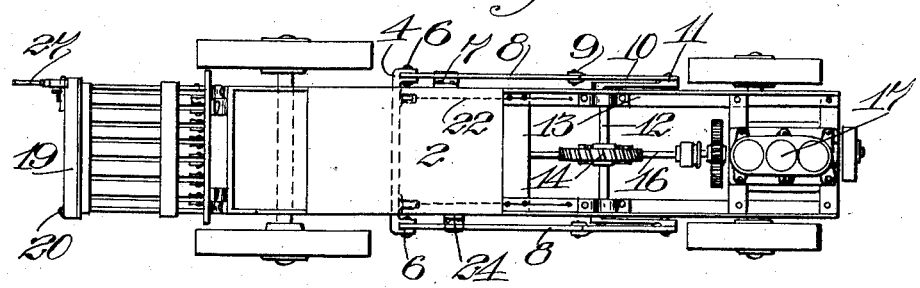

ALFRED H. PERRY, OF SAN LEANDRO, CALIFORNIA, ASSIGNOR OF TWENTY ONE-HUNDREDTHS TO M. E. SCORCE, TWENTY ONE-HUNDREDTHS TO M. A. REGO, AND TWENTY ONE-HUNDREDTHS TO M. AGRELLA, OF SAN LEANDRO, CALIFORNIA, AND TEN ONE-HUNDREDTHS TO FRANK RAMOS AND TEN ONE-HUNDREDTHS TO M. F. RAMOS, OF HAYWARD, CALIFORNIA.

HAY-PRESS.

1,015,207.      Specification of Letters Patent.      Patented Jan. 16, 1912.

Application filed July 11, 1911. Serial No. 637,887.

*To all whom it may concern:*

Be it known that I, ALFRED H. PERRY, citizen of the United States, residing at San Leandro, in the county of Alameda and State of California, have invented new and useful Improvements in Hay-Presses, of which the following is a specification.

This invention relates to hay presses, and particularly to a follower operating mechanism.

The present invention has for its object to provide an improved means for actuating the follower of a hay press, which means will be effective to compress the hay to the desired extent, and which will automatically and rapidly recede the follower from the compressing position to allow ample time for the filling of the press before the follower is again advanced; and particularly to provide a hay press mechanism adapted for continual operation but allowing ample time for the hay to be charged into the press; and also to provide an improved, readily adjusted and released gate lock.

The invention consists of the parts and the construction and combination of parts, as hereinafter more fully described and claimed, having reference to the accompanying drawings, in which—

Figure 1 is a side elevation of the improved hay press. Fig. 2 is an end view of the same, showing the door closed. Fig. 3 is a plan view of the door and its lock. Fig. 4 is a plan view of the hay press. Figs. 5 and 6 represent diagrammatically the action of the follower mechanism.

It is a desideratum to provide a hay press involving a mechanism adapted to advance the follower in regular and powerful steps, and which mechanism is adapted to be constantly actuated, yet so designed that the follower may be instantly reciprocated to allow ample time for charging the press with hay before the next regular advance of the follower.

In accomplishing the objects of the present invention, I show as slidable in a suitable press casing 2, a follower 3, of appropriate design and construction, having a transverse brace-bar 4, the ends of which project through slots 5 in the sides of the casing 2, and carry at pivots 6 the ends 7 of knuckle links 8, one of which is mounted on each side of the hay press; the other ends of the knuckle links being pivotally connected at 9 to other link sections 10 which operate with the sections 8 to form a knuckle joint. The link sections 10 are considerably shorter than the sections 8, and are pivoted upon cranks 11 of a crank-shaft 12 which is supported in suitable bearings on the hay press frame 13.

Power may be transmitted to the crankshaft 12 by any appropriate mechanism, which is here indicated as a gear 14 secured upon the shaft 12 and which is driven by a worm or other appropriate device 15 secured upon a driving-shaft 16, which may be driven from any suitable source of power, here indicated as a motor 17 Fig. 4.

In operation, the motor is designed to run constantly and drive the shaft 12 at a uniform speed. In this way the cranks 11, upon which the knuckle links are pivoted at their shorter sections 10, will constantly sweep in a regular orbit. When the crank is on its overthrow stroke, as indicated in Fig. 1, the knuckle link sections 8 and 10 which are pivoted at 9 upon each other and provided with radial abutting shoulders 18 which abut and lock the links against opening movement when the cranks are passing above center. During the continued overthrow stroke of the cranks 11 the knuckle or abutting link sections 8 and 10 act as a solid, continuous link to drive the follower 3 forwardly, by reason of the connection of the ends 7 of the sections 8 with the pivots 6 of the follower. During the forward or compressing stroke of the follower 3, hay or other material to be compressed, which has been fed into the throat of the hay press, is compressed within the casing and against a gate 19 closing the end of the press and which is pivoted thereon at 20. When the follower has been advanced its full stroke and compressed the hay against the gate 19, a plurality of dogs 21 spring behind the face of the compressed hay adjacent to the face of the follower 3, and the follower may then be reciprocated, leaving the compressed bale in position.

In providing a hay press follower mechanism designed for constant operation, without cessation between compression of bales, it is desirable to recede the follower with such rapidity as to allow ample time for filling the hay press before the follower is again advanced. An important feature of the present invention is the provision of means whereby the follower is receded in advance of the speed with which it would recede if withdrawn by a rigid connection with the operating cranks 11. This rapid and automatic recession of the follower 3 is accomplished by connecting to the rear of the follower 3 a tension device, indicated as a cord, cable or other equivalent connection 22, which may be connected to the weight 23 or equivalent device of sufficient power to retract the follower 3. The retraction of the follower 3, actuated by the tension device 22, is permitted by the breaking of the knuckle jointed links at their fulcrums 9, as indicated in Fig. 5 in full and dotted line positions. Just as the crank passes the plane in a line drawn from the center of the shaft to the link fulcrums 6, the retracting cords then become effective to pull back the follower 3. By the breaking of the links at their joints 9 the retracting cords become operative to pull the follower back. The breaking or opening of the knuckle joints is accomplished by securing upon opposite sides of the press casing 2 limiting stops 24, upon which the link sections 8 will rest when they are thrown forwardly to the position indicated in full line in Fig. 5, so that when the cranks 11 start their downward throw from the forward position, the knuckle connecting rods formed of the sections 8 and 10 will open up their joints 9 and bend, as indicated. As soon as this occurs the retracting or tension cords 22 will be allowed to become operative to pull the follower 3 backwardly, thus forcing the knuckle joints 9 to swing upwardly in an arc about the cranks 11 as a center, as indicated in dotted lines in Fig. 5. The retractive efficiency of the cords 22, connected to their actuators 23, will be sufficient to pull the follower to its rearmost position, as indicated in Fig. 6, at which time the knuckle joints 9 will have swung about the cranks 11 to a position as indicated in Fig. 6, so that during the underthrow stroke of the cranks 11, the follower 3 remains in a substantially idle position, during which time the hay press may be charged with hay. When the crank reaches its rearmost position, as indicated in Fig. 1, then when the abutting faces 18 of the knuckle jointed sections 8 and 10 are brought into juxtaposition the links will again become substantially rigid and be forced forward during the overthrow stroke of the cranks 11 to compress the material which has been fed into the press.

It will be seen that the crank-shaft 12 may be rotated constantly by its driving motor, and that at each upper half stroke of the cranks 11 the follower will be actuated by a power driven mechanism. When the cranks 11 start their downward stroke from the forward position, the automatic retracting mechanism becomes operative to pull the follower backwardly with great rapidity, giving ample time for the charging of the press.

To facilitate the opening and closing of the gate 19 after the compression and removal of a bale, I pivot at 24 upon the press casing 2 a stirrup 25, upon the outer swinging portion of which is pivoted at 26 a locking lever 27 adapted to be swung into locking position, indicated in Fig. 1, against a wearing bar 28 fastened upon the rear of the gate 19. In operation as soon as the door is closed, the lever 27 is grasped and pushed so as to swing its pivot 26 about the fulcrum 24 until the stirrup stands at right angles to the plane of the door, as indicated in Fig. 4, and then the lever 27 can be swung on its fulcrum 26 until it stands at a right angle to the plane of the door. Thus by the engagement with the inner end of the lever 27 against the wearing plate 28 a very substantial, yet easily operated lock is provided.

Having thus described my invention, what I claim and desire to secure by Letters Patent is—

1. A hay press operating mechanism comprising a follower movable in the casing of a hay press, a constantly driven crank-shaft, knuckle jointed links connecting the follower to the crank-shaft, and stationary means on the casing with which the links contact to open the joints of said links.

2. A hay press operating mechanism comprising a follower movable in the casing of a hay press, a constantly driven crank-shaft, knuckle jointed links connecting the follower to the crank-shaft, and means for opening the joints of the links, said means including limiting stops secured upon the casing of the press.

3. A hay press operating mechanism comprising a follower movable in the casing of a hay press, a constantly driven crank-shaft, knuckle jointed links connecting the follower to the crank-shaft, means for opening the joints of the links, said means including limiting stops secured upon the casing of the press, and means for retracting the hay press follower independently of the motion of the crank-shaft.

In testimony whereof I have hereunto set my hand in the presence of two subscribing witnesses.

ALFRED H. PERRY.

Witnesses:
M. A. REGO,
PHILLIP A. REGO.

Copies of this patent may be obtained for five cents each, by addressing the "Commissioner of Patents, Washington, D. C."